United States Patent [19]

Kübens et al.

[11] 4,163,095
[45] Jul. 31, 1979

[54] PROCESS FOR THE SOLVENT-FREE PRODUCTION OF SOLID PLASTIC MOLDINGS, SEALING COMPOUNDS AND INSULATIONS USING A POLYISOCYANATE MIXTURE CONTAINING 2,4'-DIISOCYANATODIPHENYLMETHANE

[75] Inventors: Rolf Kübens, Odenthal; Fritz Ehrhard, Neuss; Herbert Gebauer, Krefeld, all of Fed. Rep. of Germany

[73] Assignee: Bayer Aktiengesellschaft, Leverkusen, Fed. Rep. of Germany

[21] Appl. No.: 794,175

[22] Filed: May 5, 1977

[30] Foreign Application Priority Data

May 25, 1976 [DE] Fed. Rep. of Germany ....... 2623401

[51] Int. Cl.$^2$ ............................................. C08G 18/76
[52] U.S. Cl. ...................................................... 528/67
[58] Field of Search .................. 260/77.5 AT, 75 NT, 260/2.5 AT; 528/44–67; 521/160

[56] References Cited

U.S. PATENT DOCUMENTS

| | | | |
|---|---|---|---|
| 2,929,800 | 3/1960 | Hill | 260/77.5 AP |
| 3,277,173 | 10/1966 | Powers et al. | 260/570 |
| 3,344,162 | 9/1967 | Rowton | 260/75 TN |
| 3,362,979 | 1/1968 | Bentley | 260/453 |

*Primary Examiner*—Maurice J. Welsh
*Attorney, Agent, or Firm*—Gene Harsh; Joseph C. Gil; R. Brent Olson

[57] ABSTRACT

The instant invention is directed to a process for the solvent-free production of solid polyurethane moldings wherein the polyisocyanate used is a polyisocyanate mixture containing from 10 to 80% by weight of 2,4'-diisocyanatodiphenylmethane.

3 Claims, No Drawings

PROCESS FOR THE SOLVENT-FREE PRODUCTION OF SOLID PLASTIC MOLDINGS, SEALING COMPOUNDS AND INSULATIONS USING A POLYISOCYANATE MIXTURE CONTAINING 2,4'-DIISOCYANATODIPHENYLMETHANE

BACKGROUND OF THE INVENTION

This invention relates to an improved process for the production of solid plastic moldings based on polyurethane, and, in particular, products which are suitable for use as sealing compounds and as insulation for electric installations.

Sealing compounds used in the electrical industry for the production of solid plastic moldings or insulations, must meet high standards for the mechanical and electric properties of the plastics. In addition, these sealing compounds should be able to be prepared by as simple a method as possible, i.e. by briefly mixing the starting materials. Another requirement of such sealing compounds is that they should remain in a thin liquid state for a sufficiently long time so that, for example, when they are poured out into molds, they will completely fill all of the cavities in the mold. In the production of moldings and insulating bodies for the electrical industry, for example, in which absolute freedom from bubbles is essential because of the penetration of electric fields when the installations are in operation, the process of filling the molds is frequently carried out by a time consuming vacuum process in which it is essential that the casting resin compound should not undergo a rapid increase in viscosity.

DESCRIPTION OF THE INVENTION

It has now been found that sealing compounds which satisfy the demands of the electrical industry can be obtained by using reaction mixtures for the production of polyurethanes based on the usual polyhydroxyl compounds used in polyurethane chemistry and on polyisocyanate mixtures which have a high proportion of 2,4'-diisocyanatodiphenylmethane.

This polyisocyanate component with a high proportion of 2,4'-diisocyanatodiphenylmethane used in such liquid mixtures, which react to form polyurethanes, shows excellent compatibility with the polyhydroxyl compounds which are normally used in polyurethane chemistry, and particularly with the known polyether polyols. This means that brief mixing of the starting components is completely sufficient for preparing the liquid reaction mixture and that the sealing compound prepared by mixing the starting components shows no tendency to separate into its components and hence causes no impairment in the mechanical and electric properties of the molding which would result from such separation. This finding is surprising, since the polyisocyanate mixtures based on diphenylmethane normally used in polyurethane chemistry, which have a high proportion of 4,4'-diisocyanatodiphenylmethane and only a small proportion of 2,4'-diisocyanatodiphenylmethane, are known to be incompatible with the usual polyols based on polyethers and polyesters (Lottanti and Schiegg, Kunststoff-Plastics, 2, 1976, page 19; Baygal-Baymidur-Polyurethan-Giessharze, publication by Bayer AG, issued Nov. 1, 1974, order No. K1 43 006, page 15). For the production of polyurethane foams, this incompatibility can be eliminated or at least reduced to a tolerable level by increasing the reactivity of the polyisocyanate/polyol mixtures by the addition of catalysts such as tertiary amines or metal compounds. However, the addition of catalysts not only reduces the incompatibility phase by increasing the reaction velocity but also reduces the pot life after homogenization of the reactants. This method is therefore generally unsuitable for the preparation of plastic moldings because the casting resin compound is generally required to remain in a thin liquid state for a sufficient length of time after its components have been homogeneously mixed. Although the incompatibility has hitherto been overcome by increasing the reactivity by the addition of catalyst, and although it was known that 2,4'-diisocyanatodiphenylmethane is less reactive with polyhydroxyl compounds than the corresponding 4,4'-isomer (as described in German Auslegeschrift No. 1,923,214; column 5, lines 63 et seq), it has surprisingly been found that it is precisely this less reactive isomer which is responsible for the high compatibility of the polyisocyanate component used according to the invention with the polyol component.

Another advantage of the excellent compatibility between the polyisocyanate component and polyol component used in the process according to the invention which will be described hereinafter is that the two components can be mixed together very rapidly to form the reaction mixture, and in particular by using continuous flow mixers. The plastic moldings obtained by the process according to the invention described below not only have a consistently homogeneous structure but also have a substantially higher impact strength with the same hardness and rigidity, when compared to plastic moldings produced from polyisocyanate mixtures containing less than 10% by weight of 2,4'-diisocyanatodiphenylmethane.

The present invention thus relates to a process for the solvent-free production of solid plastic moldings, sealing compounds and insulations based on polyurethane by reaction of polyisocyanates with polyhydroxyl compounds, optionally in the presence of the usual auxiliary agents and additives used in polyurethane chemistry, characterized in that the polyisocyanates used are polyisocyanate mixtures containing from 10 to 80% by weight of 2,4'-diisocyanatodiphenylmethane.

The invention also relates to an embodiment of this process which is characterized in that the reaction mixture which forms the polyurethane is prepared in a continuous flow mixer.

The polyisocyanate component which is an essential feature of the invention consists of a polyisocyanate mixture containing from 10 to 80% by weight, and preferably from 15 to 50% by weight of 2,4'-diisocyanatodiphenylmethane. In addition to the 2,4'-isomer, the polyisocyanate component generally contains other isomeric or homologous diphenylmethane polyisocyanates. This means that the polyisocyanate component generally consists of mixtures of 2,4'-diisocyanatodiphenylmethane and 20–70% 4,4'-diisocyanatodiphenylmethane and from 0 to 20% by weight, based on the total mixture, of 2,2'-diisocyanatodiphenylmethane or it may consist of a mixture of the various isomers with higher nuclear polyphenyl polymethylene polyisocyanates. The last mentioned mixtures generally comprise A. from 10 to 80% by weight of 2,4'-diisocyanatodiphenylmethane;

B. from 20 to 70% by weight of 4,4'-diisocyanatodiphenylmethane;

C. from 0 to 20% by weight of 2,2'-diisocyanatodiphenylmethane; and

D. from 0 to 60% by weight of higher nuclear polyphenyl polymethylene polyisocyanates and preferably contain from 10 to 60% by weight of the higher nuclear products. The first mentioned mixture suitable for use as a polyisocyanate component according to the invention may be obtained, for example, by removing a diisocyanate mixture of the composition indicated above by distillation from a polyisocyanate mixture obtained by phosgenating aniline/formaldehyde condensates. The other mixture also suitable for the process according to the invention, which contains higher nuclear polyisocyanates, can be obtained, for example, by returning the last mentioned distillation product to a phosgenation product which has been depleted of 4,4'-diisocyanatodiphenylmethane, for example as described in German Auslegeschrift No. 1,923,214.

A mixture of this kind, i.e. a polyisocyanate mixture which contains a proportion of 2,4'-diisocyanatodiphenylmethane within the limits required according to the invention, can also be obtained directly by suitably controlling the process of aniline/formaldehyde condensation. U.S. Pat. No. 3,277,173, for example, describes a method of obtaining polyamine mixtures based on diphenylmethane, which contain a high proportion of 2,4'-diaminodiphenylmethane. The polyisocyanates suitable for the purpose of the invention can then be obtained directly by phosgenating these condensates which are rich in 2,4'-diaminodiphenylmethane. Methods of obtaining such polyisocyanate mixtures are also described in German Offenlegungsschrift No. 1,937,685 and U.S. Pat. No. 3,362,979. It is also possible, although not particularly advantageous, to use mixtures of MDI fractions containing a high proportion of 2,4'-diisocyanatodiphenylmethane with other polyisocyanates such as tolylene diisocyanates.

The polyol components which may be used in the process according to the invention are those which are generally used in the production of polyurethanes such as polyesters having hydroxyl groups, polyethers having hydroxyl groups, polyhydric alcohols and castor oil. Particularly suitable are hydroxyl polyethers prepared from polyhydric alcohols or amines, e.g. sucrose, glycerol, trimethylolpropane, ethylene glycol, propylene glycol, ethylenediamine and alkylene oxides such as ethylene oxide and propylene oxide having hydroxyl numbers between 50 and 600 or mixtures of these compounds or castor oil. It is also preferred to use polyol mixtures having an average hydroxyl number of from 50 to 600 which consists of one or more of the last mentioned polyether polyols and of one or more simple aliphatic diols such as ethylene glycol, tetramethylene glycol or hexamethylene glycol and polyols such as trimethylolpropane or glycerol.

The nature, functionality and quantity of reactants are generally chosen so that the reaction mixture has an average functionality for the purpose of the isocyanate polyaddition reaction of from 2 to 4, preferably 2.2 to 3. An average functionality of 3, for example, would be obtained by reacting a polyisocyanate mixture having an average isocyanate functionality of 2.8 with an equivalent quantity of a polyol mixture having an average hydroxyl functionality of 3.2.

The quantitative proportions in which the polyol component is mixed with the isocyanate component may vary within wide limits but it is preferable to use a quantity of isocyanate corresponding to from 0.5 to 2, and preferably 0.7 to 1.5, isocyanate groups per hydroxyl group.

The usual auxiliary agents and additives used in the technology of casting resins may be used in the process according to the invention. When used, they are generally added to the polyol component. Examples of such additives include water binding substances such as sodium aluminosilicates of the zeolite type; inert fillers such as quartz, heavy spar or chalk; plasticizers such as phthalic acid esters; flame retarding agents such as organic compounds containing phosphorus and/or halogens; and dyes or pigments.

The process according to the invention may also be carried out as a prepolymer process in which the polyisocyanate is first reacted with part of the polyol mixture or a polyol component and then, after having been extended with fillers, it is mixed with the remaining polyol and poured into molds for the final stage of the reaction.

According to a particular preferred embodiment of the process of the invention, mixing of the polyol component with the polyisocyanate component is carried out in continuous flow mixers with an average period of stay in the mixers of less than 60 seconds. The continuous flow mixer used for this purpose is preferably one equipped with a static blender and mixing device without moving parts. Continuous flow mixers of this type are known and have been described, for example, in German Offenlegungsschriften Nos. 1,557,118, 2,119,239, 2,202,635, 2,205,371, and 2,328,795, and German Pat. No. 1,557,058.

In the process according to the invention, the reaction mixture obtained by mixing the polyol component with the polyisocyanate component is preferably poured as a solvent-free mixture into molds where it is reacted at temperatures of from 0° to 200° C., and preferably from 10° to 180° C.

The advantages of the process according to the invention will be explained with the aid of the following examples in which the terms used have the following meaning:

Isocyanate 1—A polyisocyanate consisting of 60% by weight of 2,4'-diisocyanatodiphenylmethane and 40% by weight of 4,4'-diisocyanatodiphenylmethane. The isocyanate content is 32.8%, and the viscosity is 13 mPa s at 25° C.

Isocyanate 2—A polyisocyanate consisting of 30% by weight of 2,4'-diisocyanatodiphenylmethane, 43% of 4,4'-diisocyanatodiphenylmethane, 11% of di(isocyanatophenylmethyl)-isocyanatobenzene and 16% of higher nuclear polyphenylmethylene polyisocyanates. The isocyanate content is 32.0% and the viscosity if 72 mPa s at 25° C.

Isocyanate 3—A polyisocyanate consisting of 3% of 2,4'-diisocyanatodiphenylmethane, 54% of 4,4'-diisocyanatodiphenylmethane, 24% of di(isocyanatophenylmethyl)-isocyanatobenzene and 19% of higher nuclear polyphenyl polymethylene polyisocyanates. The isocyanate content is 31.8%, and the viscosity is 75 mPa s 25° C.

Polyol 1—A polyether polyol prepared from trimethylol propane and propylene oxide having a hydroxyl number of 370, an average molecular weight of 450 and a viscosity of 700 mPa s at 25° C.

Polyol 2—Castor oil, a commercially available natural product with a hydroxyl number of 148 and a viscosity of 930 mPa s at 25° C.

Polyol 3—A polyether polyol prepared from 1,2-propylene glycol and propylene oxide having a hydroxyl number of 59, an average molecular weight of 1900 and a viscosity of 630 mPa S at 25° C.

Polyol 4—A polyether polyol prepared from trimethylol propane and propylene oxide having a hydroxyl number of 910, an average molecular weight of 185 and a viscosity of 7000 mPa s at 25° C.

Polyol 5—A mixture of 100 parts by weight of polyol 1, 50 parts by weight of trimethylolpropane and 25 parts by weight of diethylene glycol. The three components are mixed at 80° C. and the mixture is degasified by vigorous stirring in a vacuum of 1 Torr.

EXAMPLES

EXAMPLE 1

The following arrangement is used for casting domestic transformers (bell transformers): A mixing and dosing installation consisting of A. 2 steel storage vessels with a capacity of 30 liters each. The vessels are designed to be sealed and compressed gas can be forced into them to produce a preliminary pressure.

B. 2 gear wheel dosing pumps each equipped with its own electric drive, which remove the material from the storage vessels and feed it into the continuous flow mixer. The proportions in which the components are dosed can be adjusted by means of an infinitely variable mechanical transmission.

C. Continuous flow mixer consisting of a cylindrical mixing chamber having a length of 37 mm and a diameter of 16 mm. An electrically driven finger blade agitator having a length of 36 mm and equipped with 6 stirrer blades each 3 mm in width and 14 mm in length is arranged in the axis of the cylinder.

One of the two vessels A is filled with isocyanate 2 and the other with a mixture of 50 parts by weight of polyol 1, 50 parts by weight of polyol 2 and 10 parts by weight of a paste of equal parts by weight of sodium aluminosilicate of the zeolite type and castor oil. The proportions in which the two components are mixed is adjusted to 100 parts by weight of polyol mixture and 70 parts by weight of polyisocyanate. A domestic transformer measuring 100×50×30 mm is placed in a mold of acrylonitrile-butadiene-styrene in such a position that a gap of at least 5 mm is left on all sides between the transformer and the mold.

To fill the mold, the outlet aperture of the continuous flow mixer is held over the mold. The material is ejected from the mixer at the rate of 1 liter per minute and the speed of stirring is 9000 revs/min. When the mixture has been cast, the mold is placed in a heating cupboard heated to 70° C. and removed from the cupboard after 3 hours. After removal from the mold, the sealing compound is examined for signs of separation into its components. It is found that a completely homogeneous and uniformly hardened sealing compound has been obtained.

If the casting is repeated but using isocyanate 3 instead of isocyanate 2 in the same quantity, the cast sealing compound removed from the mold shows marked signs of separation. In particular, various patches on the upper and lower surface are still soft and can easily be indented with a hard object.

EXAMPLE 2

100 parts by weight of polyol 5 and 170 parts by weight of polyisocyanate 3 are mixed at room temperature in a stainless steel vessel, using an ordinary commercial laboratory stirrer with stirrer blades. The mixing time is 10 minutes. The casting resin compound is then poured into a metal mold which has been dressed with a commercial silicone oil as mold release agent and is at a temperature of 80° C., to produce plates 10 mm in thickness. The mold is heated to 100° C. for 30 minutes and then to 120° C. for 16 hours. After cooling to room temperature, the plate is cut up into test rods which are then tested for the following properties:

| | |
|---|---|
| Flexural strength (MPa) DIN 53452: | 150 |
| Sagging (mm) DIN 53452: | 5.6 |
| Ball pressure hardness (MPa) DIN 53456: | 176 |
| Impact strength (kJ/m$^2$) DIN 53453: | 51 |

If the process is repeated but using polyisocyanate 1 instead of polyisocyanate 3 in the same quantity, the following properties are obtained:

| | |
|---|---|
| Flexural strength (MPa) DIN 53452: | 150 |
| Sagging (mm) DIN 53452: | 5.6 |
| Ball pressure hardness (MPa) DIN 53456: | 176 |
| Impact strength (kJ/m$^2$) DIN 53453: | 128 |

It can be seen that when isocyanate 1 is used instead of isocyanate 3, twice the impact strength is obtained with the same hardness and flexural strength.

EXAMPLE 3

The same mixing and dosing installation is used as described in Example 1 except that instead of the continuous flow mixer with electrically driven stirrer described there, a static continuous flow mixer without moving parts is used. This mixer consists of a steel tube 90 cm in length having an internal diameter of 10.2 mm and containing 64 baffle plates uniformly distributed over the whole length of the interior of the tube.

A mixture of 100 parts by weight of polyol 1 and 10 parts by weight of a paste consisting of equal parts by weight of sodium aluminosilicate of the zeolite type and castor oil is introduced into one of the vessels A described in Example 1. The second storage vessel is filled with isocyanate 1. The two components are mixed in proportions corresponding to 110 parts by weight of polyol mixture to 100 parts by weight of isocyanate. The mixing and dosing apparatus operates at an output of 1.2 kg of polyisocyanate/polyol mixture per minute. The mixture leaving the static mixer is conducted into a metal mold dressed with a commercial silicone oil as mold release agent, shaped to produce the housing of a water valve. The valve housing to be produced will consist essentially of two tube sections having an internal diameter of 8 cm and 6 cm, respectively, and a wall thickness of 10 mm, assembled to form a T tube. The mold is so formed that the ends of the tube are threaded.

When the mixture has been introduced into the mold, the mold is placed in a heating cupboard at 70° C. The temperature is raised to 120° C. after 2 hours and kept at this level for 12 hours. The cast molding, weighing about 1.2 kg, is removed from the mold when cool. It is completely homogeneous and shows no signs of separation into components, and the screw threads cast on it are well formed and free from any inclusions of air.

The bursting strength of the housing is tested in a hydraulic plant after the openings have been sealed by screwing caps with sealing rings on them. No changes in the molding could be seen up to a pressure of 50 bar. The test device was not designed to test higher pressures.

If the process is repeated with the only difference that isocyanate 3 is used instead of isocyanate 1, the housing member when removed from the mold is found to have numerous soft areas on its external and internal surface. In the bursting strength test, it is found to withstand a test pressure of only 7 bar.

EXAMPLE 4

A mixing and dosing installation consisting essentially of the following parts is used:

A. 2 steel storage vessels having a capacity of 30 liters each. The vessels are equipped with a stirrer mechanism and an oil jacket for heating. The temperature is adjusted to 60° C.

B. 2 piston dosing pumps consisting of cylinder sleeves of polytetrafluoroethylene and pistons of hardened steel.

C. 1 static continuous flow mixer as described in Example 3. One of the storage vessels is filled with a mixture of 50 parts by weight of polyol 4.5 parts by weight of 50% paste of sodium aluminosilicate of the zeolite type and castor oil, 1 part by weight of iron oxide brown and 50 parts by weight of quartz powder. The whole mixture is kept at 60° C. with stirring (component I).

The second vessel is filled with a mixture of equal parts of isocyanate 1 and quartz powder and this mixture is also kept at 60° C. with stirring (component II).

The dosing pumps and static mixer are preheated to 60° C. The dosing ratios are adjusted so that the mixture contains 1 part by weight of component I and two parts by weight of component II. The output rate of the static mixer is 1 kg/min. The casting resin compound discharged from the static mixer is poured into metal molds dressed with a commercial silicone oil as mold release agent and heated to 60° C. designed for the production of plates 10 mm in thickness and 10 kV pin insulators whose stem has a diameter of 5 cm and a height of 13 cm. Brass armatures are cast into the upper and lower end of the pin insulator.

When the molds have been filled they are kept at 60° C. for 4 hours and then at 160° C. for 16 hours.

The moldings removed from the mold after cooling are found to be homogeneous and free from bubbles. The plate is cut up into rods for testing the following properties:

| | | |
|---|---|---|
| Flexural stength (MPa) | DIN 53452: | 150 |
| Tensile strength (MPa) | DIN 53455: | 102 |
| Impact strength (kJ/m$^2$) | DIN 53433: | 13.0 |
| Dimensional stability under heat according to Martens (°C.) | DIN 53462: | 140 |

The pin insulator is distinguished by its high resistance to deforming forces at room temperature and at elevated temperatures. It can withstand electric voltages of up to 80 kV without electric sparkover or breakdown.

If the process is repeated in exactly the same way except that isocyanate 3 is used instead of isocyanate 1, the moldings obtained are very inhomogeneous with soft areas and bubbles. It was impossible to determine the required properties in them.

EXAMPLE 5

4200 g of a mixture prepared from 1000 g of polyol 1, 1000 g of polyol 3, 2000 g dolomite powder and 200 g of a paste of equal parts by weight of sodium aluminosilicate of the zeolite type and castor oil by mixing the components in a mechanical stirrer under a vacuum of 5 Torr at 100° C. and cooled to room temperature is mixed with 1160 g of isocyanate 1 for 50 seconds, using a commercial laboratory stirrer with blade agitator.

The casting resin compound prepared as described above is poured into a polypropylene mold designed to form a cable connecting sleeve for a 10 kV power cable.

The product is removed from the mold after 5 hours. The cable connecting sleeve is found to be completely homogeneous. The electric resistance between two phases of the cable is $10^9 \Omega$. The resistance is found to be unchanged after 24 hours storage of the cable in water.

If the process is repeated except that isocyanate 1 is replaced by an equal quantity of isocyanate 3, the cable connecting sleeve obtained is not uniformly hardened since the surface shows different hardnesses at various points. The electric insulating resistance between two phases of the cable is $10^8 \Omega$. After 24 hours storage in water, the resistance is $10^7 \Omega$.

What is claimed is:

1. In a process for the solvent-free production of solid plastic moldings, sealing compounds and insulations based on polyurethane by reacting a reaction mixture of polyisocyanates and polyhydroxyl compounds, optionally in the presence of auxiliary agents and additives used in polyurethane chemistry, the improvement wherein the polyisocyanate used is a polyisocyanate mixture containing from 10 to 80% by weight of 2,4'-diisocyanatodiphenylmethane.

2. The process of claim 2, wherein said polyisocyanate mixture consists of
   (A) from 10 to 80% by weight of 2,4'-diisocyanatodiphenylmethane,
   (B) from 20 to 70% by weight of 4,4'-diisocyanatodiphenylmethane,
   (C) from 0 to 20% by weight of 2,2'-diisocyanatodiphenylmethane.

3. The process of claim 1, wherein said polyisocyanate mixture consists of
   (A) from 10 to 80% by weight of 2,4'-diisocyanatodiphenylmethane;
   (B) from 20 to 70% by weight of 4,4'-diisocyanatodiphenylmethane;
   (C) from 0 to 20% by weight of 2,2'-diisocyanatodiphenylmethane; and
   (D) from 0 to 60% by weight of higher nuclear polyphenyl polymethylene polyisocyanate.

* * * * *